(12) United States Patent
Panakanapalli et al.

(10) Patent No.: US 12,279,161 B2
(45) Date of Patent: Apr. 15, 2025

(54) CONNECTION MANAGEMENT ON SIB1 BASED BARRED CELL

(71) Applicant: QUALCOMM Incorporated, San Diego, CA (US)

(72) Inventors: Naveen Kumar R. Panakanapalli, San Diego, CA (US); Jeongho Seo, San Diego, CA (US); Daniel Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 17/457,239

(22) Filed: Dec. 1, 2021

(65) Prior Publication Data

US 2023/0171646 A1 Jun. 1, 2023

(51) Int. Cl.
*H04W 36/00* (2009.01)
*H04W 48/20* (2009.01)

(52) U.S. Cl.
CPC ... *H04W 36/0022* (2013.01); *H04W 36/0058* (2018.08); *H04W 48/20* (2013.01)

(58) Field of Classification Search
CPC ......... H04W 36/0022; H04W 36/0058; H04W 48/20; H04W 36/0079; H04W 36/0069; H04W 36/14; H04W 48/12; H04W 48/18; H04W 76/16; H04W 76/19; H04W 88/06
USPC ................................ 370/331; 455/432.1–444
See application file for complete search history.

(56) References Cited

U.S. PATENT DOCUMENTS

| 2021/0045177 | A1  |  2/2021 | Lee et al. |
| 2021/0127310 | A1* |  4/2021 | Lee ................... H04W 48/20 |
| 2021/0250825 | A1* |  8/2021 | Purkayastha ....... H04W 36/06 |
| 2021/0321322 | A1* | 10/2021 | Wang ................. H04W 48/04 |
| 2022/0217184 | A1* |  7/2022 | Lee ................... H04L 65/1066 |

FOREIGN PATENT DOCUMENTS

WO 2021072727 A1 4/2021

OTHER PUBLICATIONS

3GPP TS 38.304, "3rd Generation Partnership Project; Technical Specification Group Radio Access Network; NR; User Equipment (UE) Procedures in Idle Mode and RRC Inactive State (Release 16)", 3GPP TS 38.304, V16.6.0, 3rd Generation Partnership Project, Mobile Competence Centre, 650, Route Des Lucioles, F-06921 Sophia-Antipolis Cedex, France, vol. RAN WG2, No. V16.6.0, Sep. 27, 2021, pp. 1-39, XP052056842, Paragraph 5.3.1.

(Continued)

*Primary Examiner* — Michael Y Mapa
(74) *Attorney, Agent, or Firm* — Procopio, Cory, Hargreaves & Savitch LLP

(57) ABSTRACT

A user equipment (UE) may be in a standalone (SA) mode and start a timer associated with barring a first cell, based on a system information block type 1 (SIB 1) decode timeout failure. The UE may receive, from a base station, a first redirection instruction to connect to the first cell in a non-standalone (NSA) mode. The UE in the NSA mode may determine that the measurement for the first cell is greater than a threshold value, and receive, from the base station a second redirection instruction to switch to the SA mode on the first cell. The UE may pause the timer and perform an initial acquisition procedure on the first cell.

21 Claims, 8 Drawing Sheets

(56) References Cited

OTHER PUBLICATIONS

International Search Report and Written Opinion—PCT/US2022/047469—ISA/EPO—Feb. 22, 2023.
Lenovo, et al., "Cell Barring Due to SIB1 Acquisition Failure", 3GPP TSG RAN WG2 Meeting #115-e, R2-2108481, 3rd Generation Partnership Project, Mobile Competence Centre, 650, Route Des Lucioles, F-06921 Sophia-Antipolis Cedex, France, vol. RAN WG2, No. Electronic, Aug. 16, 2021 -Aug. 27, 2021, Aug. 5, 2021, 6 Pages, XP052034823, Paragraph 2.2.

* cited by examiner

CONNECTION MANAGEMENT ON SIB1 BASED BARRED CELL

TECHNICAL FIELD

The present disclosure relates generally to communication systems, and more particularly, to a method of wireless communication including cell selection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The UE may be in a standalone (SA) mode and start a timer associated with barring a first cell based on a system information block type 1 (SIB1) decode timeout failure. The UE may receive, from a base station, a first redirection instruction to connect to the first cell in a non-standalone (NSA) mode. The UE in the NSA mode may determine that the measurement for the first cell is greater than a threshold value, and receive, from the base station a second redirection instruction to switch to the SA mode on the first cell. The UE may pause the timer and perform an initial acquisition (ACQ) procedure on the first cell.

The UE may perform an initial ACQ procedure on the first cell before expiration of the timer associated with barring the first cell. In one aspect, the UE may successfully decode the SIB1 on the previously barred first cell, stop the timer associated with barring the first cell, and delist the first cell from the list of the barred cell before the barring timer expires based on successfully decoding the SIB1 on the first cell. In another aspect, the UE may not successfully decode the SIB1 on the previously barred first cell, and continue running the barring timer associated with the first cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
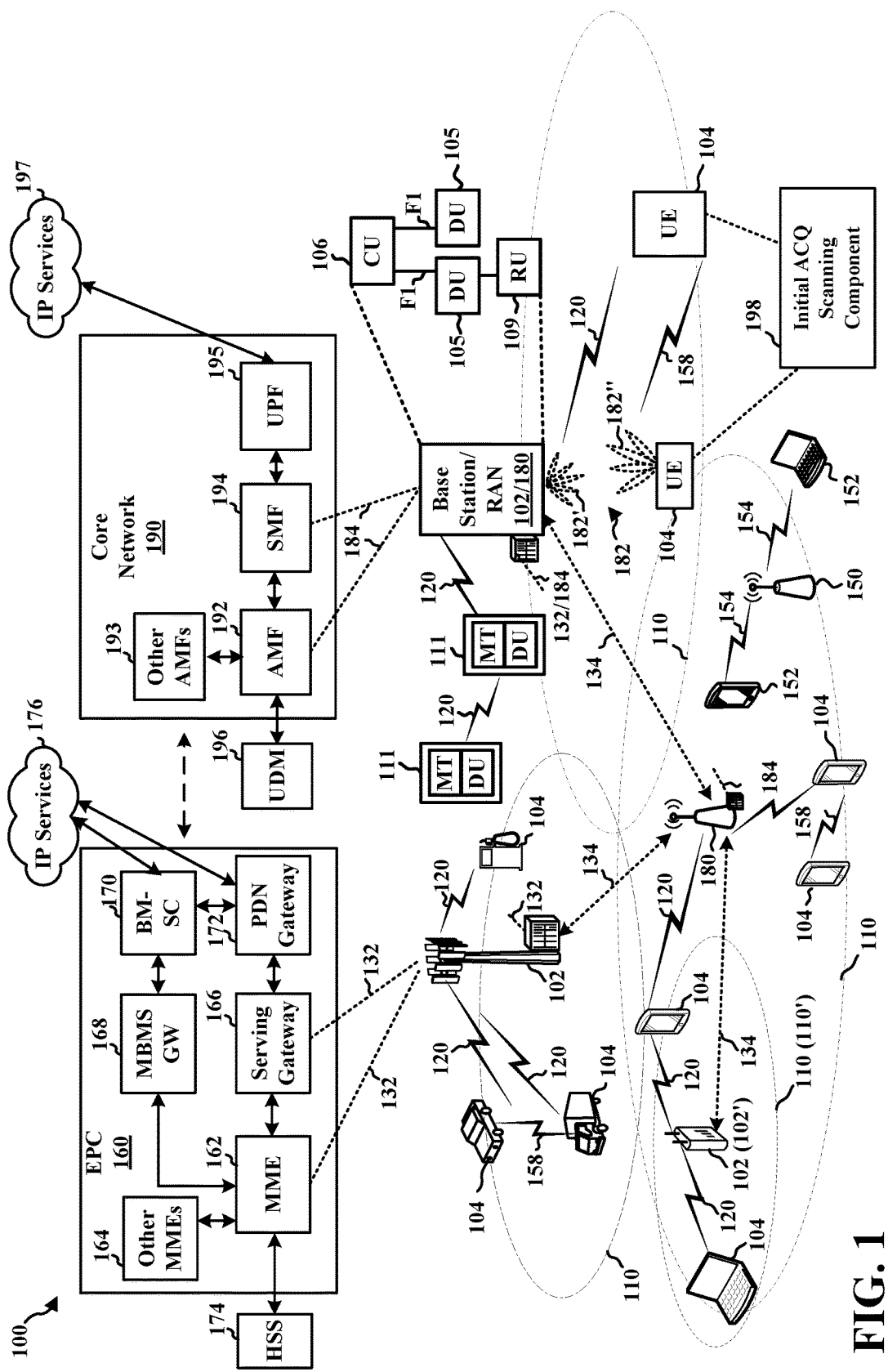
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies.

Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an initial ACQ scanning component 198 configured to initiate, while in a SA mode for a first RAT, a timer associated with barring a first cell, connect to the first cell in a NSA mode with the first RAT via a second RAT, receive, from a base station, a redirection instruction to switch to the SA mode for the first RAT on the first cell, pause the timer associated with barring the first cell based on receiving the redirection instruction to switch to the SA mode on the first cell, and perform an initial ACQ procedure on the first cell. Although the following description may be focused on 5G NR, the concepts described herein may be applicable to other similar areas, such as LTE, LTE-A, CDMA, GSM, and other wireless technologies.

Figures 2A, 2B, 2C, 2D:
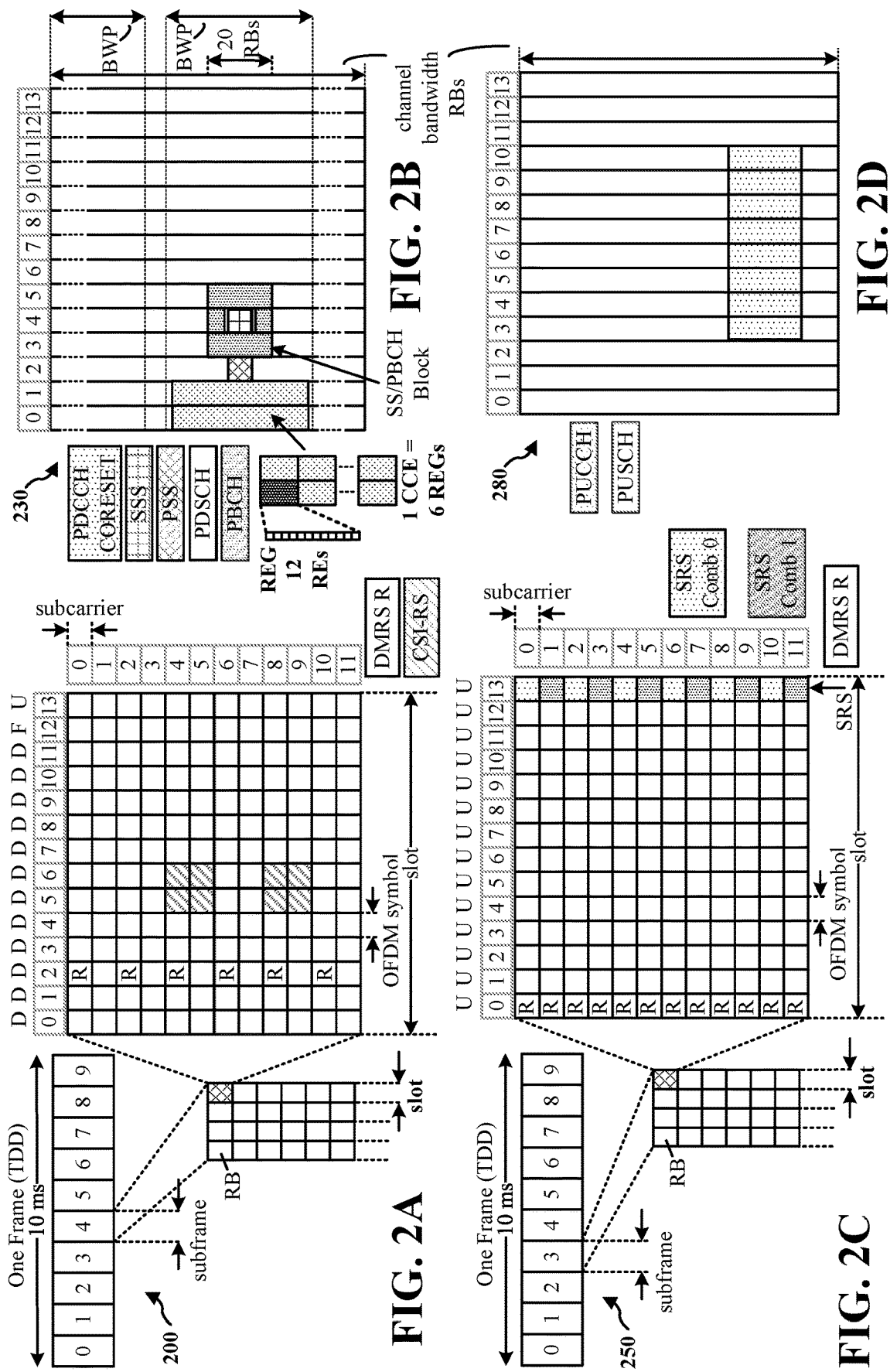
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
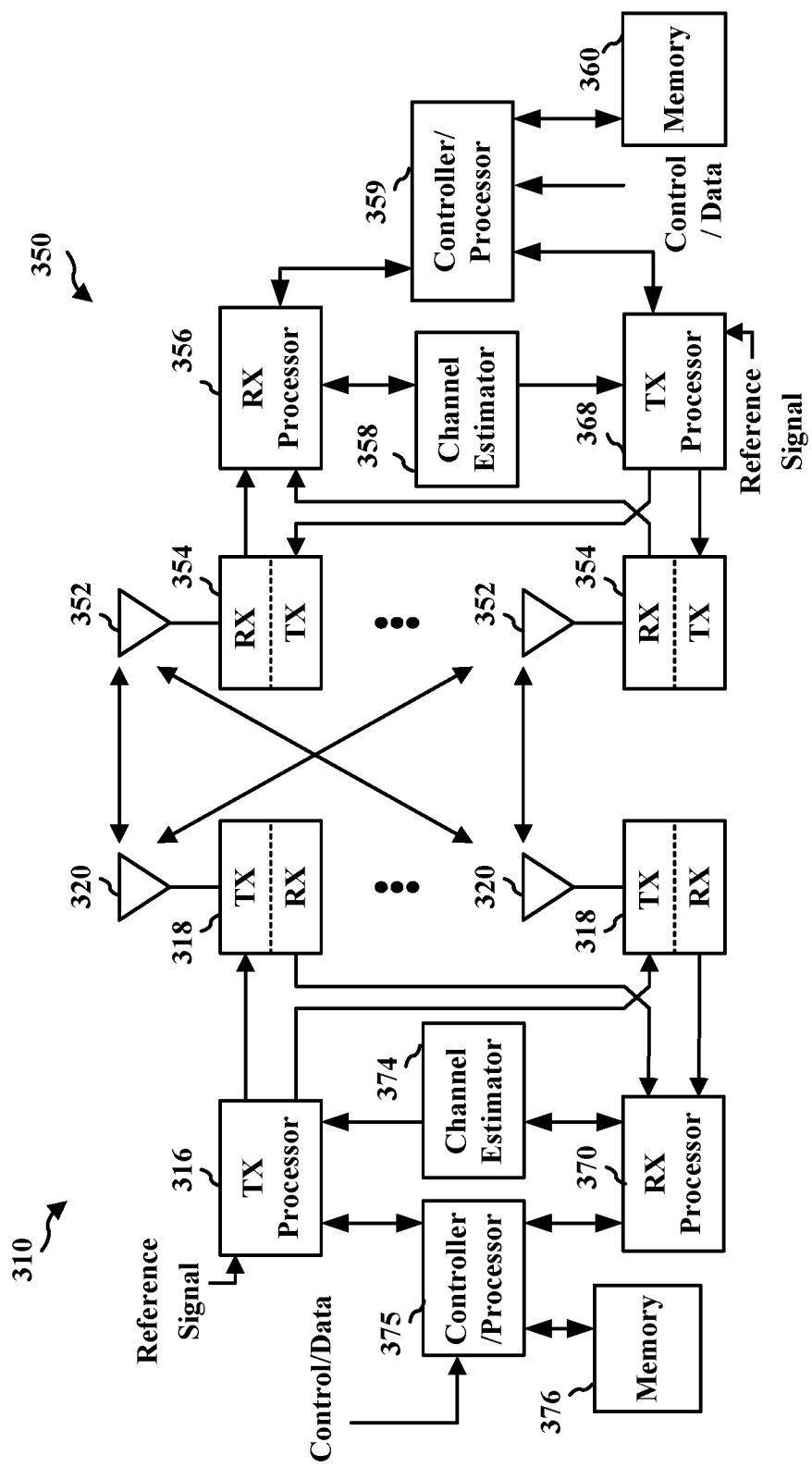
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In some aspects, a transmitter, e.g., a user equipment (UE), may have a dual carrier connectivity. Accordingly, the transmitter may connect to a network, including a base station, in a standalone (SA) mode or a non-standalone (NSA) mode. In one aspect, the UE in the SA mode may connect to the network including the base station on a first cell. In another aspect, the UE in the NSA mode may connect to the network including the base station on the first cell and a second cell. The first cell and the second cell may include a master cell group (MCG) and a secondary cell group (SCG). In the NSA mode, the network may provide control plane connection via the MCG, and the SCG may be configured to provide a user plane connection for data communication. The UE may send and receive control data and user data with the MCG, but may be limited to sending and receiving user data through the SCG.

In one example, the first cell and the second cell may be associated with the same radio access technology (RAT). For example, both of the first cell and the second cell may be associated with 5G-NR. In another example, the first cell and the second cell may be associated with different RATs. That is, the first cell may be associated with a first RAT and the second cell may be associated with a second RAT. For example, the first RAT may be the 5G-NR and the first cell may be associated with the 5G-NR and the second RAT may be the LTE and the second cell may be associated with the LTE. Although aspects are described for examples based on NR and LTE, the aspects may also be applied for other RATs.

If the first cell and the second cell are associated with different RATs, the first cell being associated with the first RAT and the second cell being associated with the second RAT, The UE may first attempt to perform an SA acquisition (ACQ) procedure and connect in the SA mode with the network through the first cell associated with the first RAT.

A UE may perform various aspects as part of a cell search, or cell acquisition, procedure. A UE may tune to a frequency and may attempt to detected an SSB and to decode a PSS and SSS in the SSB. Example aspects of an SSB are described in connection with FIG. 2B. The UE may attempt to decode the PBCH in the SSB. The UE may receive the MIB in the PBCH included in the SSB, and the MIB may include the parameters for the UE to use to decode a SIB type 1 (SIB1). As an example, the MIB may include a parameter such as a MIB.PDCCH-ConfigSIB1, which the UE may use to determine a location of a control resource set (CORESET) (e.g., CORESET0) for PDCCH/DCI for a SIB1 transmission and search space information. The UE may attempt to decode the DCI in the indicated search space, e.g., a DCI 1_0. The UE may receive some information, e.g., in an RRC message, to interpret the DCI 1_0 for SI-RNTI. The DCI message may indicate information for reception of the PDSCH carrying the SIB1. The UE may then attempt to receive the PDSCH and may attempt to decode the SIB1 carried in the PDSCH. In some aspects, the UE may attempt to decode a SIB1 for a cell for a particular duration of time, and if unsuccessful may start a timer barring the cell. The failure to decode the SIB1 that triggers the barring timer for the cell may be referred to as a SIB1 decode timeout during NR SA ACQ, in some aspects. As an example, the barring timer may be a 30 second timer.

Figure 4:
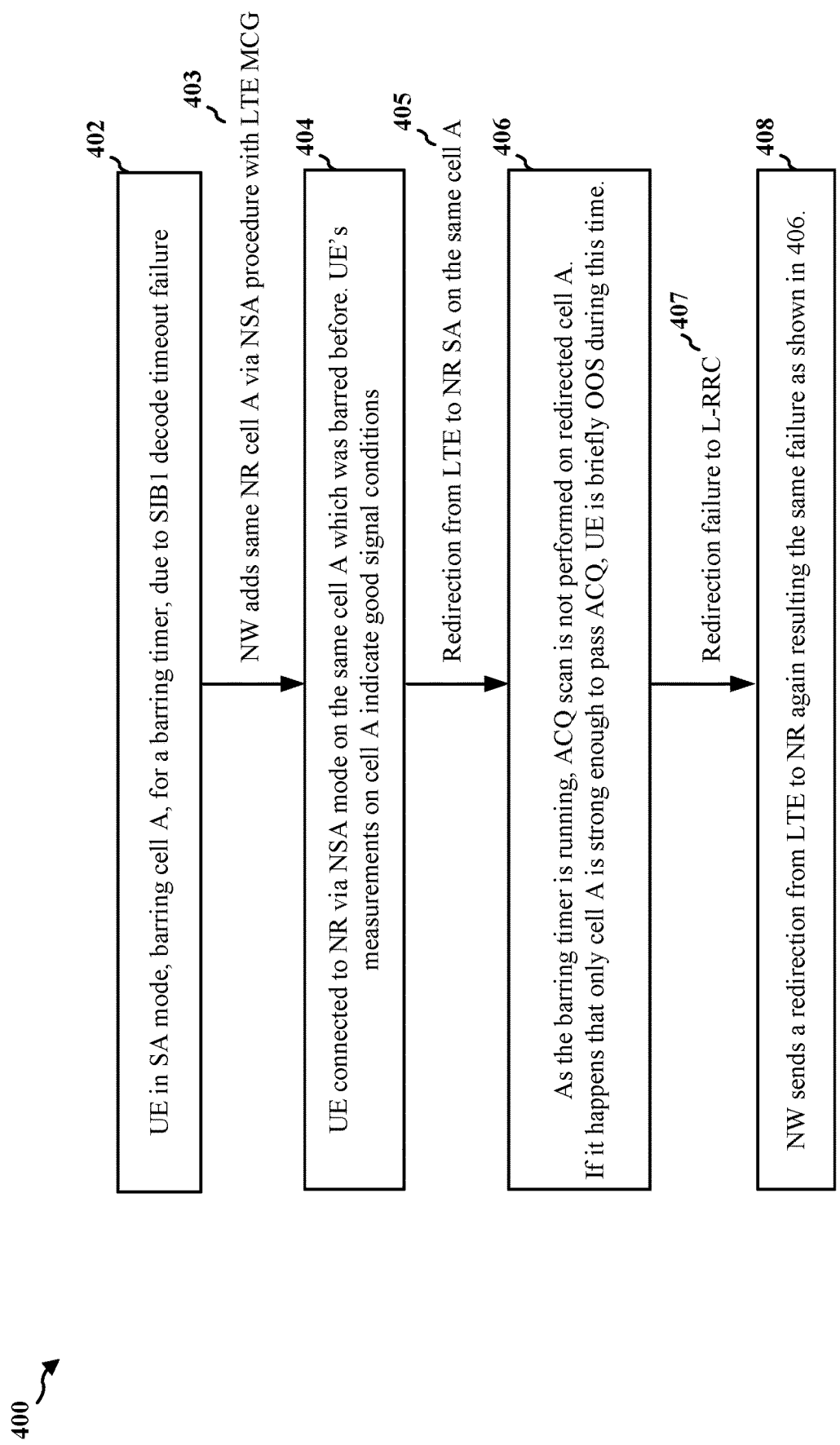
FIG. 4 is a flowchart of a method of wireless communication, in accordance with various aspects of the present disclosure.

FIG. 4 is a flowchart 400 of a method of wireless communication, in accordance with various aspects of the present disclosure. The flowchart 400 illustrates an example of method of wireless communication by a UE, the method including a process to managing an SIB1 decode timeout failure. In one aspect, the UE may start a first timer, e.g., an SIB1 decoding timer, and may attempt to receive and decode the SIB1 while the first timer runs. The UE may determine that the SIB1 decoding failed for a cell (e.g., cell A) due to a timeout. That is, UE may determine that a failure to decode the SIB1 (e.g., based on a MIB) for cell A before an expiration of the first timer. For example, the UE may fail to decode the SIB1 for the cell A due to weak signal conditions, where the UE may fail to decode a system information Radio Network Temporary Identifier (SI_RNTI) scrambled DCI or PDSCH.

At 402, the UE may be in the SA mode, and the cell A may be barred due to the SIB1 decode timeout failure. To avoid repeating the SIB1 decode timeout failure, e.g., failing to decode the SIB1 due to the timeout, on the same cell (e.g., cell A), the UE may be configured to bar the first cell (e.g., cell A) for a set time duration, e.g., a barring timer, in response to the SIB1 decode timeout failure. For example, the UE may include the first cell (e.g., cell A) in a list of barred cells and may not attempt to perform the ACQ procedure with the first cell (e.g., cell A) for the set time duration. For example, in response to the SIB1 decode timeout on the first cell (e.g., cell A), the UE may be configured to bar the first cell for 30 seconds.

At 403, the network may configure the UE to connect to the network via the NSA mode. In one aspect, the network may add the first cell (e.g., cell A) as a SCG with an MCG based on a different RAT. For example, the network may add the same NR cell (e.g., cell A) subject to the barring timer in the SA mode via an NSA procedure with an LTE MCG.

At 404, accordingly, the UE may connect to the network in the NSA mode through the second cell as the MCG and the first cell as the SCG. Here, the first cell, e.g., SCG, may be associated with a first RAT, e.g., NR, and the second cell, e.g., MCG, may be associated with a second RAT, e.g., LTE, different from the first RAT. The UE may obtain measurements on the first cell indicates that the first cell has a good signal condition. That is, before the barring timer expires, the UE in the NSA mode may measure that the first cell (cell A), e.g., to which the UE is connected as an SCG, has a good signal condition. For example, the measurement may include a reference signal received power (RSRP), and the UE in the NSA mode may determine that the RSRP of the first cell is greater than a threshold value. Here, the threshold value may be an SIB1 decoding threshold, which indicates that the cell may have a signal condition good for SIB1 decoding.

At 405, the network may instruct the UE to switch from the NSA mode to the SA mode, and redirect the connection from the second RAT, e.g., LTE, associated with the second cell to the first cell associated with the first RAT, e.g., NR. For example, the network may redirect the UE from LTE to SA NR on the same cell (e.g., cell A) that is subject to the barring timer in the SA mode. That is, as the measurement of the first cell indicates that the first cell (e.g., cell A) has a good signal condition, the network may instruct the UE to switch to the SA mode on the first cell associated with the first RAT, e.g., NR.

At 406, the barring timer may still be running, and the first cell may be barred for the UE so that the UE may not perform the ACQ procedure with the first cell until the barring timer expires. In one example, the network and the UE may be under marginal signal conditions, and the first cell may be the one cell that has a signal strong enough to pass the ACQ procedure. Accordingly, the UE may fall out of service (OOS) until the barring timer expires, although the UE measured, at 404, that the first cell has a good signal condition.

At 407, the UE may signal the redirection failure to the radio resource control layer. That is, although the network is trying to add the NR connection via redirection, the UE may fail to scan the given cell id in the SA mode as the barring timer is still running from previous SIB1 decode timeout failure, resulting in the LTE to the NR redirection failure. The UE may be briefly in the OOS state until the barring timer expires if the UE may not find another cell with a good signal condition, and the UE may miss the paging messages for frequency scan during the redirections.

At 408, after reporting the redirection failure from the LTE to the NR, the UE may move back to the LTE connection, and the network may send another LTE-to-NR redirection message causing repeated redirection failures and missing page messages. That is, the network may send another redirection from the LTE to NR again which may result in the same redirection failure illustrated at 406, if the barring timer did not expire. Accordingly, the first cell may still be barred due the SIB1 timeout failure, and the LTE-to-NR redirection may result in the UE facing the OOS state. The redirection from the second RAT, e.g., LTE, associated with the second cell to the first RAT, e.g., NR, associated with the first cell may result in the redirection failure upon transitioning from the SA mode to the NSA mode and back to the SA mode.

Aspects presented herein provide for improved cell acquisition, e.g., that may include a SIB1 failure or barred cell. The aspects presented herein may help the UE to perform a more efficient cell acquisition and/or to avoid a loss of coverage.

Figure 5:
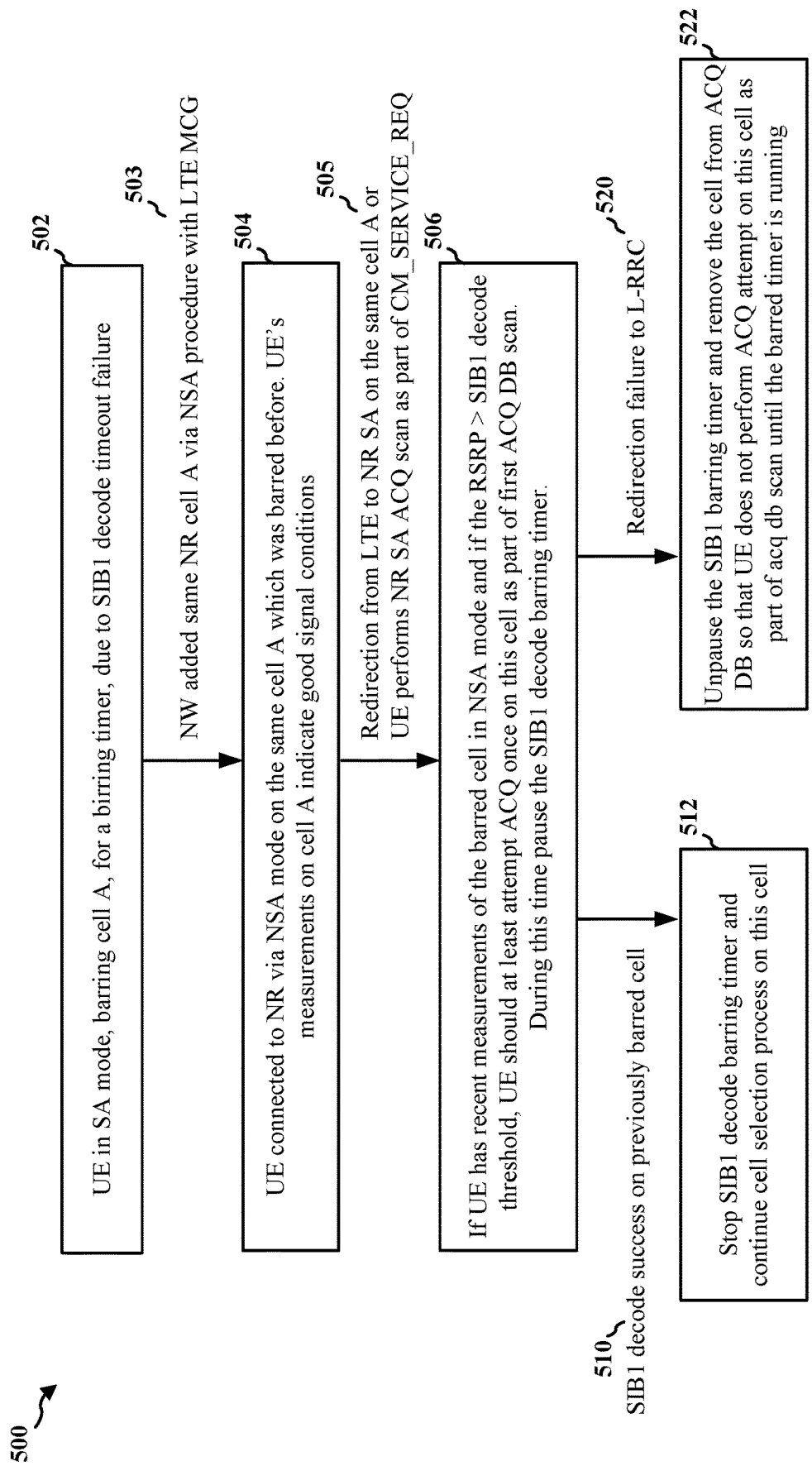
FIG. 5 is a flowchart of a method of wireless communication, in accordance with various aspects of the present disclosure.

FIG. 5 is a flowchart 500 of a method of wireless communication, in accordance with various aspects of the present disclosure. The flowchart 500 illustrates an example of UE's method of wireless communication including a process to managing an SIB1 decode timeout failure. In one aspect, the UE may start a first timer, e.g., an SIB1 decoding timer, and may attempt to receive and decode the SIB1 while the first timer runs. The UE may determine an occurrence of a SIB1 decoding failed due to a timeout during which the UE fails to correctly decode a SIB1 for a cell (e.g., cell A). As example in connection with 402 in FIG. 4, the UE may determine that the SIB1 decoding failed due to the timeout based on an expiration of the first timer before successfully decoding the SIB1 based on the MIB. For example, the UE may fail to decode the SIB1 due to weak signal conditions, where the UE may fail to decode a system information Radio Network Temporary Identifier (SI_RNTI) scrambled DCI or PDSCH.

At 502, the UE may be in the SA mode, and may bar the first cell (e.g., cell A) from SA cell acquisition due to the SIB1 decode timeout failure. To avoid or reduce repeating the SIB1 decode timeout failure, e.g., failing to decode the SIB1 due to the timeout, on the same cell, the UE may be configured to bar the first cell (e.g., cell A) for a set time duration, e.g., until a barring timer expires, in response to detecting the SIB1 decode timeout failure on the first cell. For example, the UE may be configure to include the first cell (e.g., cell A) in a list of barred cells and may not attempt to perform the ACQ procedure with the first cell for the set time duration of the barring timer. For example, in response to the SIB1 decode timeout on the first cell, the UE may bar SA acquisition on the first cell for 30 seconds, e.g., the barring timer may have a duration of 30 seconds.

At 503, the network may configure the UE to connect to the network in an NSA mode. In one aspect, the network may add the first cell (e.g., cell A) as the SCG to a second cell, e.g., the MCG, and instruct the UE to connect to the first cell and the second cell in the NSA mode. As an example, the network may add an NR cell A, which is subject to the barring timer in the SA mode, via the NSA procedure with an LTE MCG.

At 504, accordingly, the UE may connect to the network in the NSA mode through the second cell as the MCG and the first cell (e.g., cell A) as the SCG. Here, the first cell, e.g., SCG, may be associated with a first RAT, e.g., NR, and the second cell, e.g., MCG, may be associated with a second RAT, e.g., LTE, different from the first RAT. The UE may decide that the measurement on the first cell indicates that the first cell has a good signal condition. That is, before the barring timer for cell A expires, the UE in the NSA mode may perform a measurement of cell A, e.g., as a SCG, that indicates that the cell A has a good signal condition for the UE. For example, the measurement may include the RSRP, and the UE in the NSA mode may determine that the RSRP of the first cell (e.g., cell A) is greater than a threshold value. Here, the threshold value may be an SIB1 decode threshold which indicates that the cell may have a signal condition good for SIB1 decoding.

At 505, In one aspect, the network may instruct the UE to switch from the NSA mode to the SA mode, and redirect the connection from the second RAT, e.g., LTE, associated with the second cell to the first cell associated with the first RAT, e.g., NR. For example, the network may redirect the UE from an NSA mode with LTE to an NR SA mode on the same cell (e.g., cell A). For example, as the measurement of the first cell (e.g., cell A) indicates that the first cell has good signal condition, the network may instruct the UE to switch to the SA mode on the first cell associated with the first RAT, e.g., NR. In another aspect, the UE may perform the NR SA ACQ scan as a part of a connection management (CM) service request. That is, to transmit the CM service request, the UE may perform the ACQ scan on the first cell.

At 506, while the barring timer for cell A may still be running, and the first cell may still be barred for SA cell acquisition for the UE, the UE may perform the ACQ procedure with the first cell (e.g., cell A) based on one or more conditions having been met. As an example, the UE may perform the ACQ with the cell A if a recent measurement of the barred cell, e.g., cell A, in the NSA mode is greater than the threshold value. That is, based on one or more conditions being satisfied, which indicate that the first cell may have a good signal condition, the UE may be perform the initial ACQ procedure on the first cell (e.g., cell A) even when the first cell is in the barred cell list and the UE is barred from performing the initial ACQ procedure on the first cell until the barring timer expires. In one aspect, the UE may pause the barring timer based on determining to perform the initial ACQ procedure with the barred first cell.

At 510, the UE may determine that the SIB1 decoding on the previously barred first cell performed at 506 was successful. That is, the UE may successfully decode the SI_RNTI scrambled DCI or PDSCH. At 512, In response to the successful decoding of the SIB1, the UE may stop the barring timer on the first cell and continue with the cell selection process on the first cell. That is, the UE may perform the initial ACQ procedure on the barred first cell before the barring timer expires based on determining that the first cell has a good signal condition, and delist the first cell from the list of the barred cell before the barring timer expires based on successfully decoding the SIB1 on the first cell.

At 520, the UE may determine that the SIB1 decoding on the previously barred first cell performed at the 506 was unsuccessful. That is, the UE was not able to successfully decode the SI_RNTI scrambled DCI or PDSCH again. At 522, in response to the unsuccessful decoding of the SIB1, the UE may un-pause the barring timer and let the barring timer continue to elapse. The UE may also be configured to remove the first cell from the ACQ database, so that the UE may not perform the ACQ attempt on the first cell, until the barred timer expires.

Compared to the flowchart 400 (refer to FIG. 4), the flowchart 500 enables the UE to perform at least one ACQ attempt on the SIB1 barred cell during the NSA-to-SA transition, if a condition is satisfied that indicates the barred cell energy has improved based on the UE's NSA search measurements. That is, if the UE determines that the barred cell included in the list of barred cells may a good signal condition, the UE may be attempt the ACQ procedure on the barred signal in response to receiving the NSA-to-SA redirection instruction from the base station. The network may use the same cell for both the NSA mode and the SA mode, and the approach presented in the flowchart 500 may provide the UE with the chance to obtain service more quickly and to avoid or reduce missing a page and/or a redirection failure.

Figure 6:
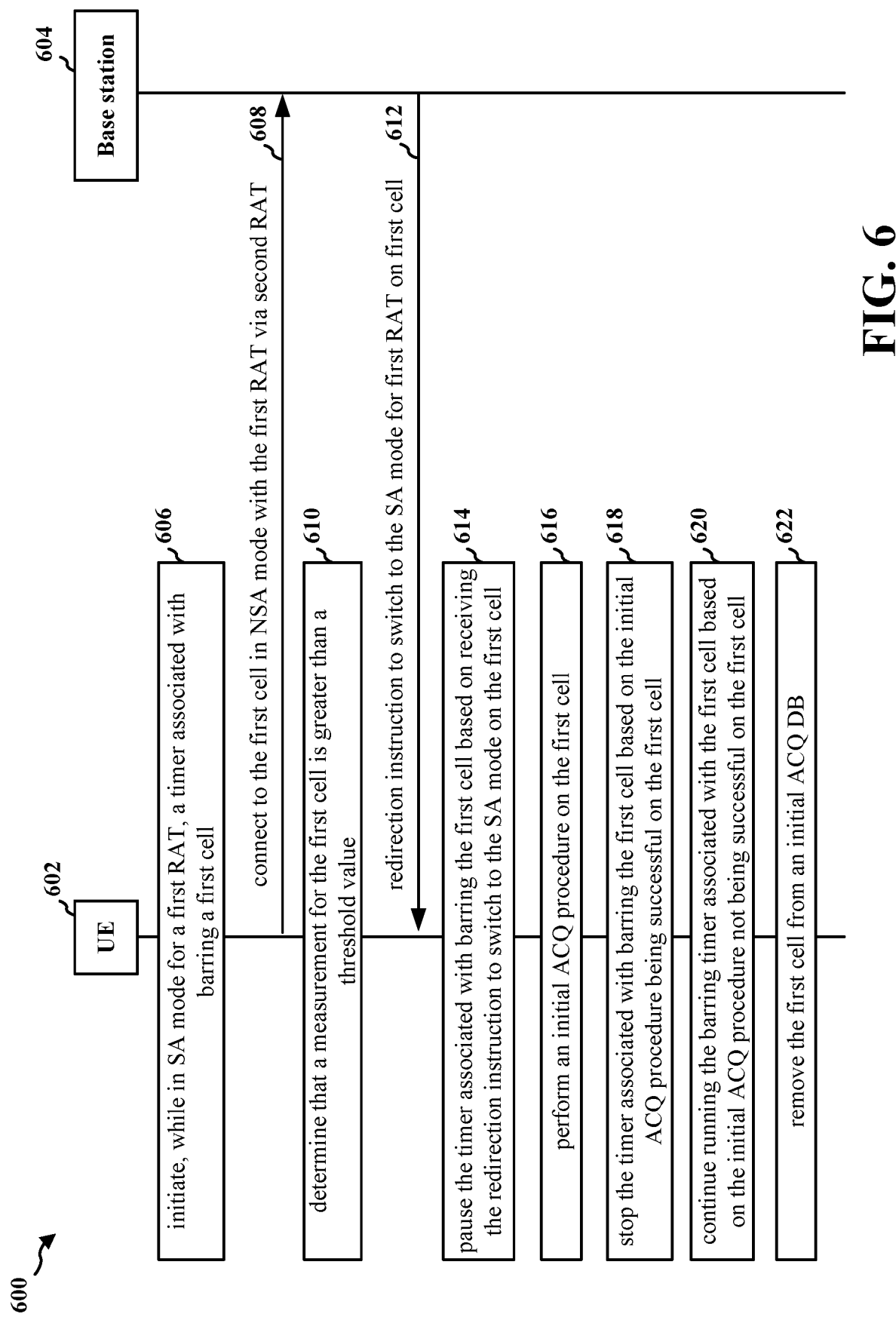
FIG. 6 is a call-flow diagram of a method of wireless communication, in accordance with various aspects of the present disclosure.

FIG. 6 is a call-flow diagram 600 of a method of wireless communication, in accordance with various aspects of the present disclosure. The call-flow diagram 600 may include a UE 602 and a base station 604. The UE 602 in an SA mode may start a timer associated with barring a first cell, and the connected to the first cell in an NSA mode. the UE in the NSA mode may determine that the measurement for the first cell is greater than a threshold value, and receive, from the base station 604 a redirection instruction to switch to the SA mode on the first cell. The UE 602 may pause the timer and perform an initial ACQ procedure on the first cell.

At 606, the UE 602 may initiate, while in a SA mode for a first RAT, a timer associated with barring a first cell. Here, the timer may be initiated based on a SIB1 decode timeout failure prior to entering the NSA mode on the first cell. That is, the UE 602 may be in the SA mode, and bar the first cell due to an SIB1 decode timeout failure to avoid or reduce the SIB 1 decode timeout failure, the UE 602 may be configured to bar the first cell for a set time duration, e.g., a barring timer, based on detecting the SIB1 decode timeout failure on the first cell. For example, in response to the SIB 1 decode timeout on the first cell, the UE 602 may be configured to bar the first cell for 30 seconds, and the barring timer may be configured for 30 seconds.

At 608, the UE 602 may connect to the first cell in an NSA mode with the first RAT via a second RAT. Here, the first RAT may be the NR and the second RAT may be the LTE. That is, the network may add the first cell as the SCG to a second cell, e.g., the MCG, and instruct the UE 602 to connect to the first cell and the second cell in the NSA mode. The UE 602 may connect to the network in the NSA mode through the second cell as the MCG and the first cell as the SCG, and the first cell, e.g., SCG, may be associated with a first RAT, e.g., NR, and the second cell, e.g., MCG, may be associated with a second RAT, e.g., LTE, different from the first RAT.

At 610, the UE 602 may determine that a measurement for the first cell is greater than a threshold value. That is, before the barring timer expires, the UE 602 in the NSA mode may measure that the first cell, e.g., SCG, has a good signal condition. Here, the measurement may include an RSRP of the first cell, and the threshold value may correspond to a threshold RSRP to decode a SIB1. That is, the measurement may include the RSRP, and the UE 602 in the NSA mode may determine that the RSRP of the first cell is greater than a threshold value. Here, the threshold value may be an SIB1 decode threshold which indicates that the cell may have a signal condition good for SIB1 decoding.

At 612, the UE 602 may receive, from a base station 604, a redirection instruction to switch to the SA mode for the first RAT on the first cell. That is, the network may instruct the UE 602 to switch to the SA mode on the first cell associated with the first RAT, e.g., NR. For example, the network may send the redirection instruction based on the measurement of the first cell at 610 indicating that the first cell has good signal condition. In another aspect, the UE 602 may perform the NR SA ACQ scan as a part of a CM service request. That is, to transmit the CM service request, the UE 602 may perform the ACQ scan on the first cell.

At 614, the UE 602 may pause the timer associated with barring the first cell based on receiving the redirection instruction to switch to the SA mode on the first cell. That is, based on receiving the redirection instruction to switch to the SA mode for the first RAT on the first cell while the barring timer is running, the UE 602 may be configured to pause the barring timer associated with the first cell. Here, the UE 602 may be configured to pause the timer associated with barring the first cell further based on the determination that the measurement for the first cell is greater than the threshold value at 610.

At 616, the UE 602 may perform an initial ACQ procedure on the first cell. That is, based on receiving the redirection instruction to switch to the SA mode for the first RAT on the first cell while the barring timer is running, the UE 602 may be configured to perform the initial ACQ procedure on the first cell. Here, the UE 602 may be configured to perform the initial ACQ procedure on the first cell further based on the determination that the measurement for the first cell is greater than the threshold value at 610. In one aspect, the UE 602 may successfully decode the SIB1 on the previously barred first cell. In another aspect, the UE 602 may not successfully decode the SIB1 on the previously barred first cell.

In one aspect, the UE 602 may successfully decode the SIB1 on the previously barred first cell. At 618, the UE 602 may stop the timer associated with barring the first cell based on the initial ACQ procedure being successful on the first cell. Based on the UE 602 determining that the SIB1 decoding on the previously barred first cell performed at 616 was successful, the UE 602 may stop the barring timer on the first cell and continue with the cell selection process on the first cell. That is, the UE 602 may perform the initial ACQ procedure on the barred first cell before the barring timer expires based on determining that the first cell has a good signal condition, and delist the first cell from the list of the barred cell before the barring timer expires based on successfully decoding the SIB1 on the first cell.

In another aspect, the UE 602 may not successfully decode the SIB1 on the previously barred first cell. At 620, the UE 602 may continue running the barring timer associated with the first cell based on the initial ACQ procedure not being successful on the first cell. Based on determining that the UE 602 was not able to successfully decode the SI_RNTI scrambled DCI or PDSCH again, the UE 602 may un-pause the barring timer and let the barring timer laps.

At 622, the UE 602 may remove the first cell from an ACQ DB. That is, the UE 602 may also be configured to remove the first cell from the ACQ database, so that the UE 602 may not perform the ACQ attempt on the first cell, until the barred timer expires.

Figure 7:
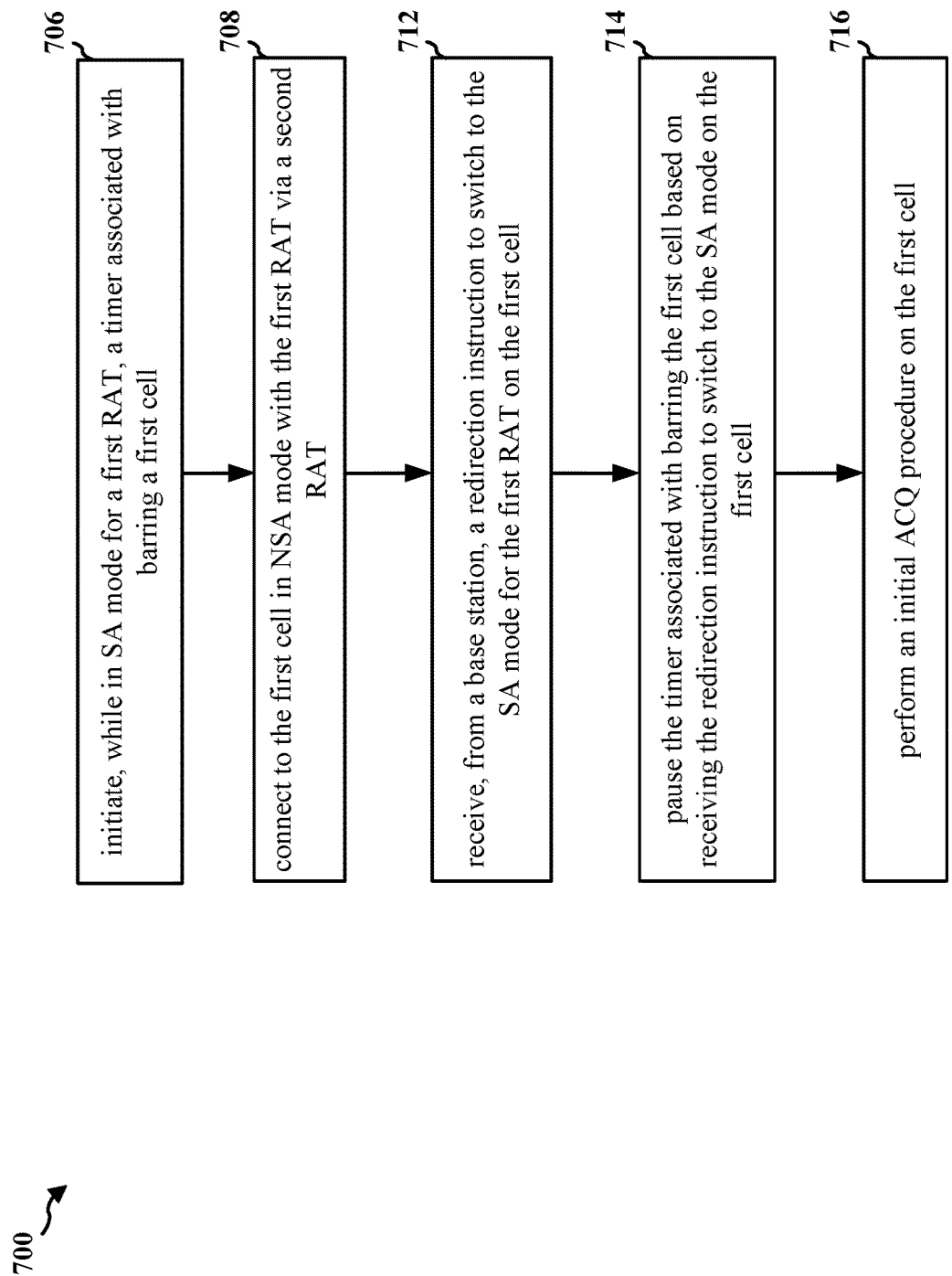
FIG. 7 is a flowchart of a method of wireless communication, in accordance with various aspects of the present disclosure.

FIG. 7 is a flowchart 700 of a method of wireless communication, in accordance with various aspects of the present disclosure. The method may be performed by a UE (e.g., the UE 104; the apparatus 802). The UE in an SA mode may start a timer associated with barring a first cell, and the connected to the first cell in an NSA mode. the UE in the NSA mode may determine that the measurement for the first cell is greater than a threshold value, and receive, from a base station a redirection instruction to switch to the SA mode on the first cell. The UE may pause the timer and perform an initial ACQ procedure on the first cell.

At 706, the UE may initiate, while in a SA mode for a first RAT, a timer associated with barring a first cell. Here, the timer may be initiated based on a SIB 1 decode timeout failure prior to entering the NSA mode on the first cell. That is, the UE may be in the SA mode, and bar the first cell due to an SIB1 decode timeout failure to avoid or reduce the SIB1 decode timeout failure, the UE may be configured to bar the first cell for a set time duration, e.g., a barring timer, based on detecting the SIB1 decode timeout failure on the first cell. For example, in response to the SIB 1 decode timeout on the first cell, the UE may be configured to bar the first cell for 30 seconds, and the barring timer may be configured for 30 seconds. For example, at 606, the UE 602 may initiate, while in a SA mode for a first RAT, a timer associated with barring a first cell. Furthermore, 706 may be performed by an initial ACQ scanning component 840.

At 708, the UE may connect to the first cell in an NSA mode with the first RAT via a second RAT. Here, the first RAT may be the NR and the second RAT may be the LTE. That is, the network may add the first cell as the SCG to a second cell, e.g., the MCG, and instruct the UE to connect to the first cell and the second cell in the NSA mode. The UE may connect to the network in the NSA mode through the second cell as the MCG and the first cell as the SCG, and the first cell, e.g., SCG, may be associated with a first RAT, e.g., NR, and the second cell, e.g., MCG, may be associated with a second RAT, e.g., LTE, different from the first RAT. For example, at 608, the UE 602 may connect to the first cell in an NSA mode with the first RAT via a second RAT. Furthermore, 708 may be performed by the initial ACQ scanning component 840.

In one aspect, the UE may determine that a measurement for the first cell is greater than a threshold value. That is, before the barring timer expires, the UE in the NSA mode may measure that the first cell, e.g., SCG, has a good signal condition. Here, the measurement may include an RSRP of the first cell, and the threshold value may correspond to a threshold RSRP to decode a SIB1. That is, the measurement may include the RSRP, and the UE in the NSA mode may determine that the RSRP of the first cell is greater than a threshold value. Here, the threshold value may be an SIB1 decode threshold which indicates that the cell may have a signal condition good for SIB1 decoding.

At 712, the UE may receive, from a base station, a redirection instruction to switch to the SA mode for the first RAT on the first cell. That is, the network may instruct the UE to switch to the SA mode on the first cell associated with the first RAT, e.g., NR. For example, the network may send the redirection instruction based on the measurement of the first cell indicating that the first cell has good signal condition. In another aspect, the UE may perform the NR SA ACQ scan as a part of a CM service request. That is, to transmit the CM service request, the UE may perform the ACQ scan on the first cell. For example, at 612, the UE 602 may receive, from a base station 604, a redirection instruction to switch to the SA mode for the first RAT on the first cell. Furthermore, 712 may be performed by the initial ACQ scanning component 840.

At 714, the UE may pause the timer associated with barring the first cell based on receiving the redirection instruction to switch to the SA mode on the first cell. That is, based on receiving the redirection instruction to switch to the SA mode for the first RAT on the first cell while the barring timer is running, the UE may be configured to pause the barring timer associated with the first cell. Here, the UE may be configured to pause the timer associated with barring the first cell further based on the determination that the measurement for the first cell is greater than the threshold value. For example, at 614, the UE 602 may pause the timer associated with barring the first cell based on receiving the redirection instruction to switch to the SA mode on the first cell. Furthermore, 714 may be performed by the initial ACQ scanning component 840.

At 716, the UE may perform an initial ACQ procedure on the first cell. That is, based on receiving the redirection instruction to switch to the SA mode for the first RAT on the first cell while the barring timer is running, the UE may be configured to perform the initial ACQ procedure on the first cell. Here, the UE may be configured to perform the initial ACQ procedure on the first cell further based on the determination that the measurement for the first cell is greater than the threshold value. In one aspect, the UE may successfully decode the SIB1 on the previously barred first cell. In another aspect, the UE may not successfully decode the SIB1 on the previously barred first cell. For example, at 616, the UE 602 may perform an initial ACQ procedure on the first cell. Furthermore, 716 may be performed by the initial ACQ scanning component 840.

In one aspect, the UE may successfully decode the SIB1 on the previously barred first cell. The UE may stop the timer associated with barring the first cell based on the initial ACQ procedure being successful on the first cell. Based on the UE determining that the SIB1 decoding on the previously barred first cell performed at 716 was successful, the UE may stop the barring timer on the first cell and continue with the cell selection process on the first cell. That is, the UE may perform the initial ACQ procedure on the barred first cell before the barring timer expires based on determining that the first cell has a good signal condition, and delist the first cell from the list of the barred cell before the barring timer expires based on successfully decoding the SIB1 on the first cell.

In another aspect, the UE may not successfully decode the SIB1 on the previously barred first cell. The UE may continue running the barring timer associated with the first cell based on the initial ACQ procedure not being successful on the first cell. Based on determining that the UE was not able to successfully decode the SI_RNTI scrambled DCI or PDSCH again, the UE may un-pause the barring timer and let the barring timer laps.

In one aspect, the UE may remove the first cell from an ACQ DB. That is, the UE may also be configured to remove the first cell from the ACQ database, so that the UE may not perform the ACQ attempt on the first cell, until the barred timer expires.

Figure 8:
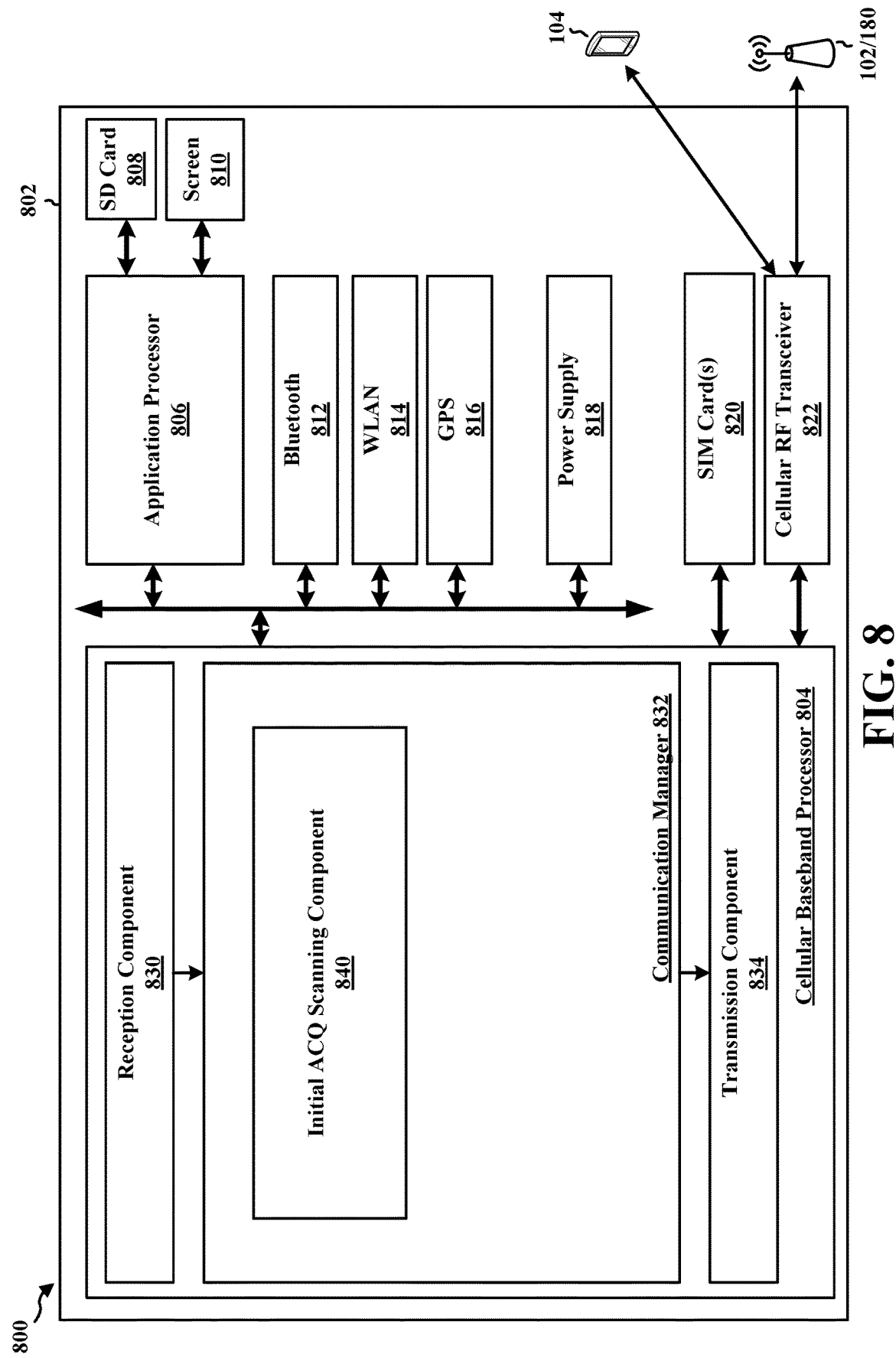
FIG. 8 is a diagram illustrating an example of a hardware implementation for an example apparatus, in accordance with various aspects of the present disclosure.

FIG. 8 is a diagram 800 illustrating an example of a hardware implementation for an apparatus 802. The apparatus 802 may be a UE, a component of a UE, or may implement UE functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, or a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The communication manager 832 includes an initial ACQ scanning component 840 that is configured to initiate, while in an SA mode for a first RAT, a timer associated with barring a first cell; connect to the first cell in a NSA mode with the first RAT via a second RAT; receive, from a base station, a redirection instruction to switch to the SA mode for the first RAT on the first cell; pause the timer associated with barring the first cell based on receiving the redirection instruction to switch to the SA mode on the first cell; and perform an initial ACQ procedure on the first cell, e.g., as described in connection with FIG. 7.

The apparatus may include additional components that perform each of the blocks of the algorithm in the flowcharts of FIGS. 6 and 7. As such, each block in the flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for initiating, while in a SA mode for a first RAT, a timer associated with barring a first cell, means for connecting to the first cell in a NSA mode with the first RAT via a second RAT, means for receiving, from a base station, a redirection instruction to switch to the SA mode for the first RAT on the first cell, means for pausing the timer associated with barring the first cell based on receiving the redirection instruction to switch to the SA mode on the first cell, and means for performing an initial ACQ procedure on the first cell. The apparatus 802 includes means for pausing the timer associated with barring the first cell if a measurement for the first cell is greater than a threshold value, means for stopping the timer associated with barring the first cell based on the initial ACQ procedure being successful on the first cell, means for continuing running the barring timer associated with the first cell based on the initial ACQ procedure not being successful on the first cell, and means for removing the first cell from an ACQ DB. The means may be one or more of the components of the apparatus 802 configured to perform the functions recited by the means. As described supra, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

A UE may be in an SA mode and start a timer associated with barring a first cell based on an SIB1 decode timeout failure. The UE may receive, from a base station, a first redirection instruction to connect to the first cell in an NSA mode. The UE in the NSA mode may determine that the measurement for the first cell is greater than a threshold value, and receive, from the base station a second redirection instruction to switch to the SA mode on the first cell. The UE may pause the timer and perform an initial ACQ procedure on the first cell.

The UE may perform an initial ACQ procedure on the first cell before expiration of the timer associated with barring the first cell. In one aspect, the UE may successfully decode the SIB1 on the previously barred first cell, stop the timer associated with barring the first cell, and delist the first cell from the list of the barred cell before the barring timer expires based on successfully decoding the SIB1 on the first cell. In another aspect, the UE may not successfully decode the SIB1 on the previously barred first cell, and continue running the barring timer associated with the first cell.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, including: initiating, while in a SA mode for a first RAT, a timer associated with barring a first cell, connecting to the first cell in a NSA mode with the first RAT via a second RAT, receiving, from a base station, a redirection instruction to switch to the SA mode for the first RAT on the first cell, pausing the timer associated with barring the first cell based on receiving the redirection instruction to switch to the SA mode on the first cell, and performing an initial ACQ procedure on the first cell.

Aspect 2 is the method of aspect 1, further including pausing the timer associated with barring the first cell if a measurement for the first cell is greater than a threshold value.

Aspect 3 is the method of aspect 2, where the measurement includes an RSRP.

Aspect 4 is the method of aspect 3, where the threshold value corresponds to a threshold RSRP to decode a SIB1.

Aspect 5 is the method of any of aspects 1 to 4, further including stopping the timer associated with barring the first cell based on the initial ACQ procedure being successful on the first cell.

Aspect 6 is the method of any of aspects 1 to 4, further including continuing running the barring timer associated with the first cell based on the initial ACQ procedure not being successful on the first cell.

Aspect 7 is the method of aspect 6, further including removing the first cell from an ACQ DB.

Aspect 8 is the method of any of aspects 1 to 7, where the first RAT is NR and the second RAT is LTE.

Aspect 9 is the method of any of aspects 1 to 8, an initiation of the timer being based on a SIB1 decode timeout failure prior to entering the NSA mode on the first cell.

Aspect 10 is an apparatus for wireless communication including at least one processor coupled to a memory and configured to implement a method as in any of aspects 1 to 9.

Aspect 11 is an apparatus for wireless communication including means for implementing a method as in any of aspects 1 to 9.

Aspect 12 is a computer-readable medium storing computer executable code, where the code when executed by a processor causes the processor to implement a method as in any of aspects 1 to 9.

What is claimed is:

1. An apparatus for wireless communication at a user equipment (UE), comprising:
   memory; and
   at least one processor coupled to the memory and configured to:
      initiate, while in a standalone (SA) mode for a first radio access technology (RAT), a timer associated with barring a first cell;
      connect to the first cell in a non-standalone (NSA) mode with the first RAT via a second RAT;
      receive, from a base station, a redirection instruction to switch to the SA mode for the first RAT on the first cell;
      pause the timer associated with barring the first cell based on receiving the redirection instruction to switch to the SA mode on the first cell; and
      perform an initial acquisition (ACQ) procedure on the first cell, and based on whether the initial ACQ procedure is successful on the first cell, perform one of:
         stop the timer associated with barring the first cell; or
         continue running the timer associated with barring the first cell.

2. The apparatus of claim 1, wherein the pause of the timer associated with barring the first cell is further based on a measurement for the first cell that is greater than a threshold value.

3. The apparatus of claim 2, wherein the measurement includes a reference signal received power (RSRP).

4. The apparatus of claim 3, wherein the threshold value corresponds to a threshold RSRP to decode a system information block 1 (SIB1).

5. The apparatus of claim 1, wherein the at least one processor is further configured to:
stop the timer associated with barring the first cell based on the initial ACQ procedure being successful on the first cell.

6. The apparatus of claim 1, wherein the at least one processor is configured to:
continue running the timer associated with the first cell based on the initial ACQ procedure not being successful on the first cell.

7. The apparatus of claim 6, wherein the at least one processor is further configured to:
remove the first cell from an ACQ database (DB).

8. The apparatus of claim 1, wherein the first RAT is new radio (NR) and the second RAT is long-term evolution (LTE).

9. The apparatus of claim 1, wherein an initiation of the timer is based on a system information block type 1 (SIB1) decode timeout failure prior to entering the NSA mode on the first cell.

10. The apparatus of claim 1, further comprising a transceiver coupled to the at least one processor.

11. A method of wireless communication of a user equipment (UE), comprising:
initiating, while in a standalone (SA) mode for a first radio access technology (RAT), a timer associated with barring a first cell;
connecting to the first cell in a non-standalone (NSA) mode with the first RAT via a second RAT;
receiving, from a base station, a redirection instruction to switch to the SA mode for the first RAT on the first cell;
pausing the timer associated with barring the first cell based on receiving the redirection instruction to switch to the SA mode on the first cell;
performing an initial acquisition (ACQ) procedure on the first cell; and
performing, based on whether the initial ACQ procedure is successful on the first cell, one of:
stopping the timer associated with barring the first cell; or
continuing to run the timer associated with barring the first cell.

12. The method of claim 11, wherein the pausing the timer associated with barring the first cell based on a measurement for the first cell that is greater than a threshold value.

13. The method of claim 12, wherein the measurement includes a reference signal received power (RSRP).

14. The method of claim 13, wherein the threshold value corresponds to a threshold RSRP to decode a system information block type 1 (SIB1).

15. The method of claim 11, wherein the method includes:
stopping the timer associated with barring the first cell based on the initial ACQ procedure being successful on the first cell.

16. The method of claim 11, wherein the method includes:
continuing to run the timer associated with the first cell based on the initial ACQ procedure not being successful on the first cell.

17. The method of claim 16, further comprising:
removing the first cell from an ACQ database (DB).

18. The method of claim 11, wherein the first RAT is new radio (NR) and the second RAT is long-term evolution (LTE).

19. The method of claim 11, wherein an initiation of the timer is based on a system information block 1 (SIB1), decode timeout failure prior to entering the NSA mode on the first cell.

20. An apparatus for wireless communication at a user equipment (UE), comprising:
means for initiating, while in a standalone (SA) mode for a first radio access technology (RAT), a timer associated with barring a first cell;
means for connecting to the first cell in a non-standalone (NSA) mode with the first RAT via a second RAT;
means for receiving, from a base station, a redirection instruction to switch to the SA mode for the first RAT on the first cell;
means for pausing the timer associated with barring the first cell based on receiving the redirection instruction to switch to the SA mode on the first cell;
means for performing an initial acquisition (ACQ) procedure on the first cell; and
means for performing, based on whether the initial ACQ procedure is successful on the first cell, one of:
stopping the timer associated with barring the first cell; or
continuing to run the timer associated with barring the first cell.

21. A non-transitory computer-readable medium storing computer executable code at a user equipment (UE), the code when executed by a processor causes the processor to:
initiate, while in a standalone (SA) mode for a first radio access technology (RAT), a timer associated with barring a first cell;
connect to the first cell in a non-standalone (NSA) mode with the first RAT via a second RAT;
receive, from a base station, a redirection instruction to switch to the SA mode for the first RAT on the first cell;
pause the timer associated with barring the first cell based on receiving the redirection instruction to switch to the SA mode on the first cell; and
perform an initial acquisition (ACQ) procedure on the first cell, and based on whether the initial ACQ procedure is successful on the first cell, perform one of:
stop the timer associated with barring the first cell; or
continue running the timer associated with barring the first cell.

* * * * *